J. W. & C. F. REED.
Hog-Trap.

No. 206,262. Patented July 23, 1878.

Attest:
F. W. Burnham
E. Welsh

Inventor
J. W. Reed
C. F. Reed
By their attorney
Charles E. Foster

UNITED STATES PATENT OFFICE.

JEREMIAH W. REED AND CHARLES F. REED, OF DE GRAFF, OHIO.

IMPROVEMENT IN HOG-TRAPS.

Specification forming part of Letters Patent No. 206,262, dated July 23, 1878; application filed June 26, 1878.

*To all whom it may concern:*

Be it known that we, JEREMIAH W. REED and CHARLES F. REED, of De Graff, Logan county, Ohio, have invented Improvements in Hog Trap and Holder, of which the following is a specification:

Our invention relates to that class of hog-holders in which two longitudinally-sliding recessed plates are employed; and consists in the combination, with said plates, of devices which, by a single movement, will separate the plates, so that a number of animals may pass through, or bring them together, so as to gripe a single animal at the neck.

Figure 1:
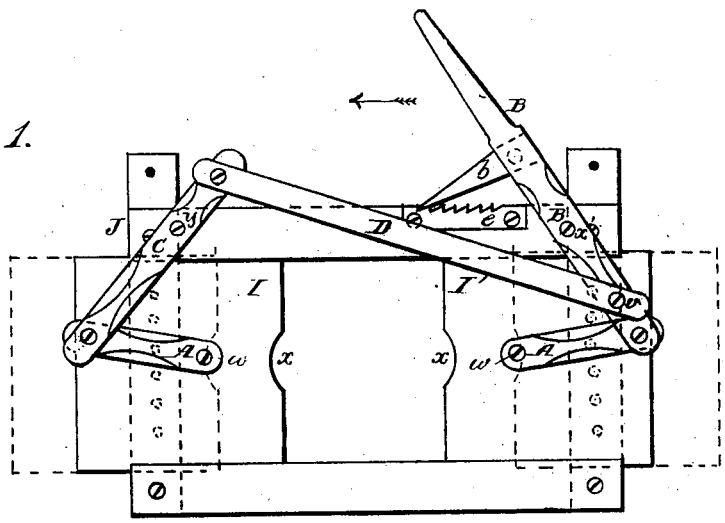
Figure 2:
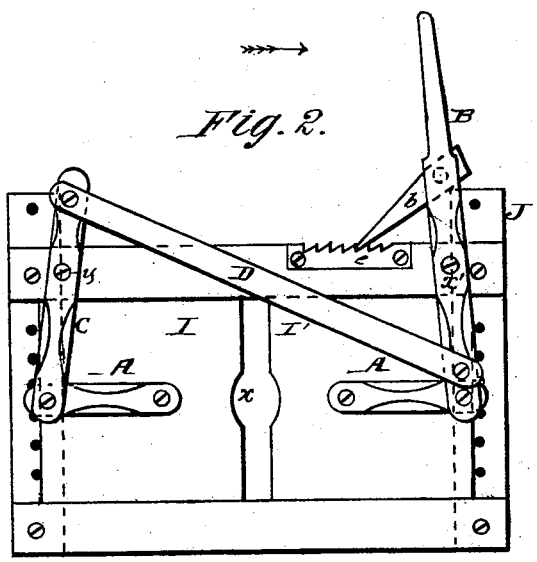

In the drawing, which forms part of this specification, Figure 1 is an elevation showing the plates open, and Fig. 2 an elevation showing them closed.

Heretofore it has been common in hog-traps to use suspended levers or clamps vibrating on pivots with operating-levers, so as to separate or bring the clamps together. This form is objectionable, as a high frame must be employed, and as the clamps cannot be thrown wide open for the passage of a drove without placing the operating devices at an elevation near the pivots, and because, when closed, spaces are left at the sides of the clamps, through which the animals can escape.

Our invention consists in employing, in combination with the usual sliding plates, which require only a low frame, and can be closed without leaving any side openings, certain devices for opening and closing the same.

The plates I I', each having a recess, $x$, slide in guides in the frame J, to which are pivoted levers B C, at the points $x'$ $y$. Each lever is connected at the lower end to an arm, A, pivoted, at $w$, to one of the sliding plates, and a connecting-arm, D, secured to the upper end of the lever C, is jointed to the lever B at a point, $v$, below the fulcrum $x'$.

By throwing the lever B in the direction of its arrow, Fig. 1, the arms and levers will be operated to instantly widely separate the plates I I', so that a number of animals can pass freely between them. When an animal that it is desired to secure reaches the trap, the lever B is drawn in the direction of its arrow, Fig. 2, when both plates will be brought together and the animal will be secured, the parts being retained by a pawl, $b$, catching upon a ratchet, $e$.

We are aware that sliding gates have been used, and that levers have been employed for operating the same; but it will be seen that by the peculiar arrangement of arms and levers shown herein the gate may be opened to a great extent, to permit the passage of a drove, without the use of the ordinary high frame-work, and that no side passages are afforded for the escape of the animals.

We claim—

The frame J, provided with longitudinal guides for the sliding plates I I', in combination with the levers B C, arms A A, and bar D, connecting the upper end of the lever C and the lever B, below its fulcrum, all constructed and arranged to operate as set forth.

In testimony whereof we have signed our names to this specification in the presence of two subscribing witnesses.

JEREMIAH W. REED.
CHARLES F. REED.

Witnesses:
JACOB KRESS,
JOSEPH MATHISON.